(12) United States Patent
Wang

(10) Patent No.: US 7,155,545 B1
(45) Date of Patent: Dec. 26, 2006

(54) USB CONNECTOR

(75) Inventor: Hong-Si Wang, Taipei (TW)

(73) Assignee: VIA Technologies, Inc., Taipei (TW)

( * ) Notice: Subject to any disclaimer, the term of this patent is extended or adjusted under 35 U.S.C. 154(b) by 0 days.

(21) Appl. No.: 11/342,737

(22) Filed: Jan. 30, 2006

(30) Foreign Application Priority Data

Dec. 29, 2005 (TW) .............. 94147232 A

(51) Int. Cl.
*G06F 13/12* (2006.01)
*H01R 33/00* (2006.01)
*H01R 24/00* (2006.01)

(52) U.S. Cl. ............... 710/72; 710/302; 710/313; 439/660

(58) Field of Classification Search ........... 710/62–64, 710/72–74, 305–313, 300–302; 439/660–668, 439/607
See application file for complete search history.

(56) References Cited

U.S. PATENT DOCUMENTS

| | | | |
|---|---|---|---|
| 6,086,430 A * | 7/2000 | Amoni et al. ............ | 439/680 |
| 6,813,164 B1 * | 11/2004 | Yen ........................ | 361/785 |
| 6,900,988 B1 * | 5/2005 | Yen ........................ | 361/737 |
| 7,021,971 B1 * | 4/2006 | Chou et al. ............. | 439/660 |
| 7,104,848 B1 * | 9/2006 | Chou et al. ............. | 439/660 |
| 7,108,560 B1 * | 9/2006 | Chou et al. ............. | 439/660 |
| 2003/0100203 A1 * | 5/2003 | Yen ........................ | 439/79 |
| 2004/0024812 A1 * | 2/2004 | Park et al. ............... | 709/203 |
| 2004/0029422 A1 * | 2/2004 | Yen ........................ | 439/79 |
| 2004/0033726 A1 * | 2/2004 | Kao ........................ | 439/660 |
| 2004/0038565 A1 * | 2/2004 | Yen ........................ | 439/79 |
| 2005/0042930 A1 * | 2/2005 | Harkabi et al. .......... | 439/660 |
| 2005/0059301 A1 * | 3/2005 | Chou et al. ............. | 439/660 |
| 2005/0228934 A1 * | 10/2005 | Tsutsui .................... | 710/313 |
| 2006/0094301 A1 * | 5/2006 | Lee et al. ................ | 439/660 |

* cited by examiner

*Primary Examiner*—Christopher Shin
(74) *Attorney, Agent, or Firm*—Thomas, Kayden, Horstemeyer & Risley

(57) ABSTRACT

A universal serial bus (USB) connector for connecting a host and a universal serial bus device includes a main body, a first pin disposed in the main body connecting to a power supply, a second pin disposed in the main body transmitting signal D−, a third pin disposed in the main body transmitting signal D+, and a fourth pin disposed in the main body connecting to ground. The third pin is shorter than the second pin by a predetermined length, whereby the host recognizes the universal serial bus device correctly when the universal serial bus device is connected to the host by the universal serial bus connector from the host.

10 Claims, 11 Drawing Sheets

USB CONNECTOR

BACKGROUND

The invention relates to a universal serial bus (hereinafter USB) connector, and in particular to a USB connector with a pin transmitting signal D+ shorter than the pin transmitting signal D− by a predetermined length.

A conventional USB 2.0 connector is shown in FIGS. 1a, 1b, 1c and 1d. The USB connector 100 comprises a first pin 10, a second pin 20, a third pin 30 and a fourth pin 40. The first pin transmits signal VBUS, the second pin 20 transmits signal D−, the third pin transmits signal D+, and the fourth pin transmits signal GND. The first pin 10 is as long as the fourth pin 40. The second pin 20 is as long as the third pin 30. In the described structure, as the second pin 20 and the third pin 30 have the same length, when the USB connector 100 enters a USB socket (not shown), the third pin 30 transmitting signal D+ can contact the pin of the USB socket prior to the second pin 20 transmitting signal D−. This reduces data transmission from high 480 Mbps (USB 2.0) to full speed 12 Mbps, as shown in FIGS. 2a, 2b and 2c.

FIG. 2a depicts a conventional USB connector 100 connecting a host 120 and a device 140. FIG. 2b depicts signals D+ and D− when the USB connector 100 connects host 120 and device 140 in a normal condition (USB 2.0). When USB connector 100 connects host 120 and the device 140, host 120 lowers the signal D+ and D− to 0 v for reset. When the third pin 30 connects the host 120 and device 140, device 140 converts signal D− to signal chirpk (800 mv), and host 120 converts signal D− to 3 pairs KJ signals (3 KJ pair 800 mv) for HANDSHAKING. In such a condition, the host 120 is connected to the device 140 with the USB 2.0 specification for high speed transmission. In the described normal condition, the second pin 20 contacts the host 120 before the third pin 30, and the signal chirpk is generated after the reset. In an abnormal condition, however, the third pin 30 contacts the host 120 before the second pin 20 as shown in FIG. 2c. When the third pin 30 contacts the host 120 first, device 140 is to transmit signal chirpk, but the second pin 20 reset is not accomplished. The signal D− is recognized as 3.3 v rather than chirpk (800 mv). In such a condition, the host 120 is unable to transmit data at the high speed of USB 2.0.

SUMMARY

An embodiment of a USB connector of the invention comprises a main body, a first pin disposed in the main body connecting to a power supply, a second pin disposed in the main body transmitting signal D−, a third pin disposed in the main body transmitting signal D+, and a fourth pin disposed in the main body connecting to ground. The third pin is shorter than the second pin by a predetermined length, whereby the host recognizes the universal serial bus device correctly when the universal serial bus device is connected to the host by the universal serial bus connector from the host.

The USB connector of the invention is applicable to male connectors of Series A-type, Series B-type or Series mini B-type. The USB connector of the invention is also applicable to female connectors of Series A-type, Series B-type or Series mini B-type.

BRIEF DESCRIPTION OF THE DRAWINGS

The invention can be more fully understood by reading the subsequent detailed description and examples with references made to the accompanying drawings, wherein.

DETAILED DESCRIPTION

Figure 1A:
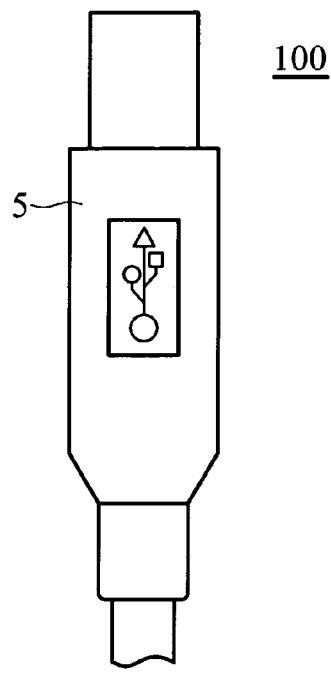
FIGS. 1a, 1b, 1c and 1d depict a conventional USB connector of Series B-type.
Figure 1B:
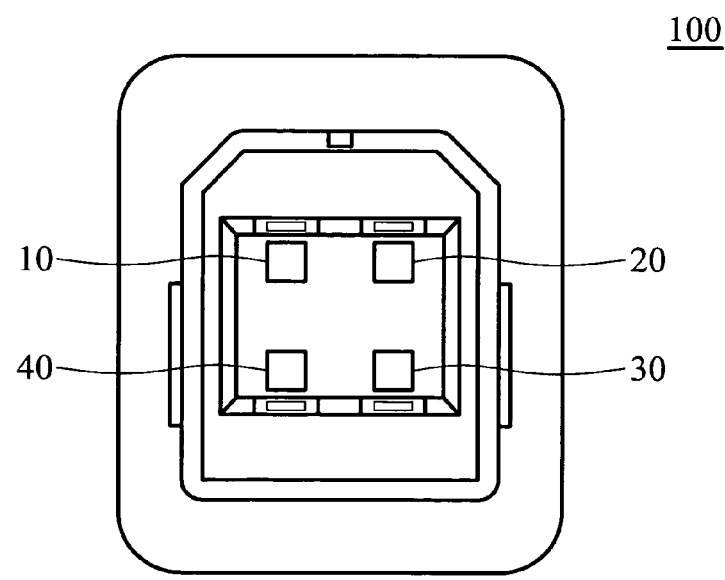
Figure 1C:
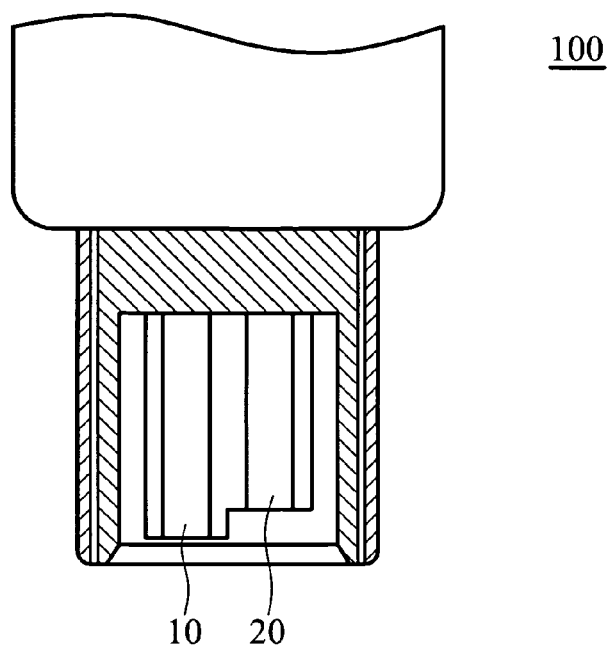
Figure 1D:
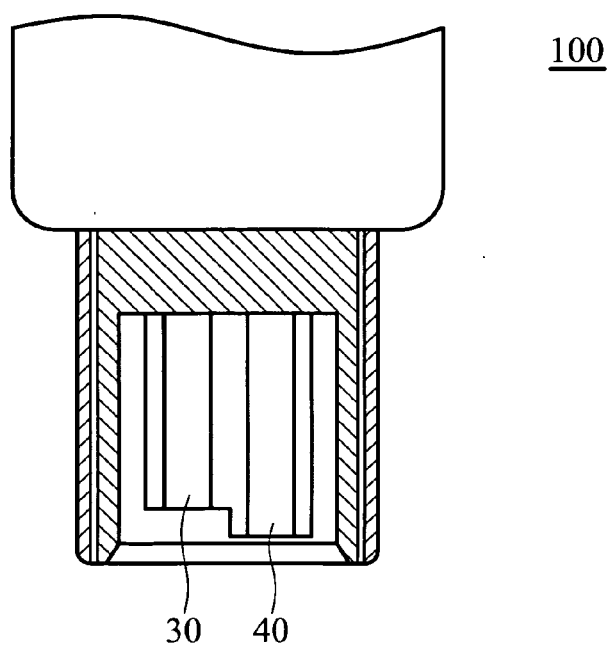
Figure 2A:
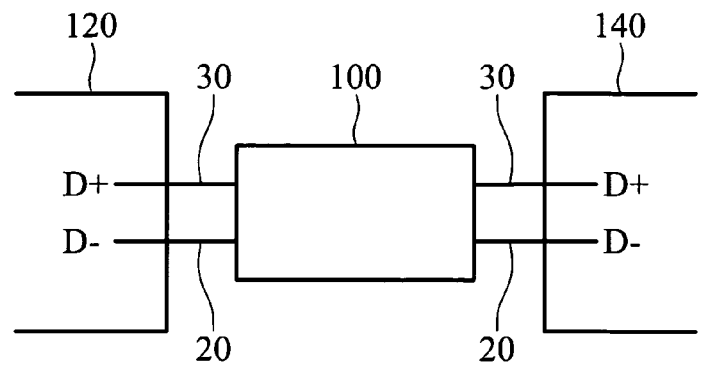
FIG. 2a depicts a conventional USB connector connecting a host and a device.
Figure 2B:
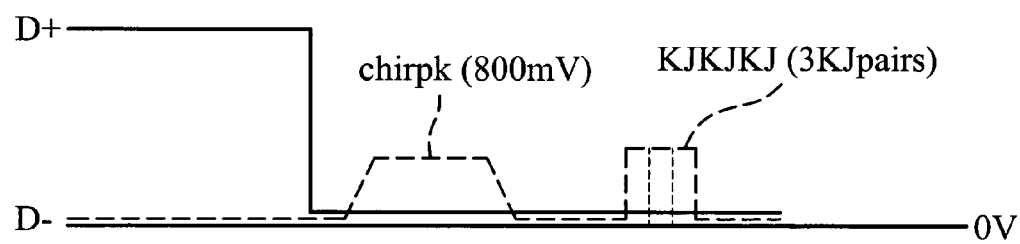
FIG. 2b depicts signal D+ and D− in a normal condition.
Figure 2C:
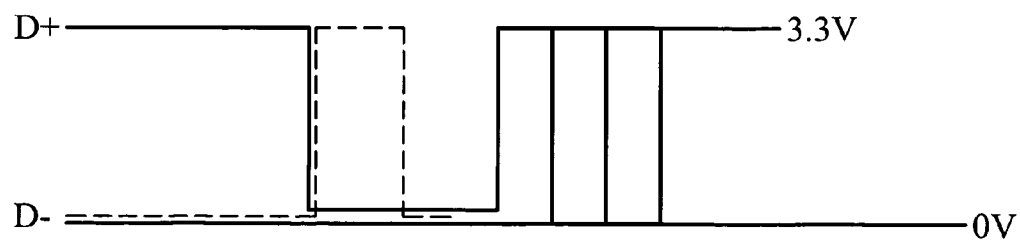
FIG. 2c depicts signal D+ and D− in an abnormal condition.
Figure 3A:
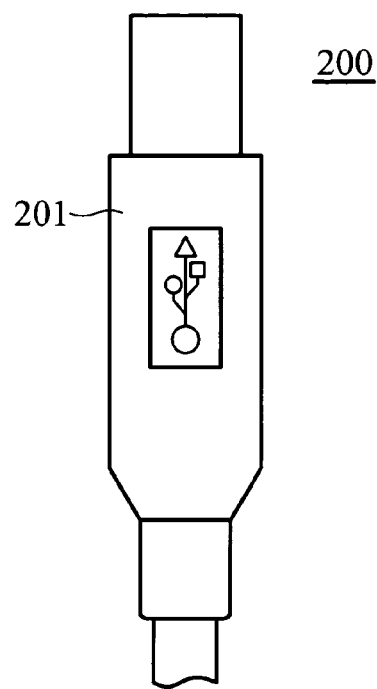
FIGS. 3a, 3b, 3c and 3d depict an embodiment of the USB connector of the invention.
Figure 3B:
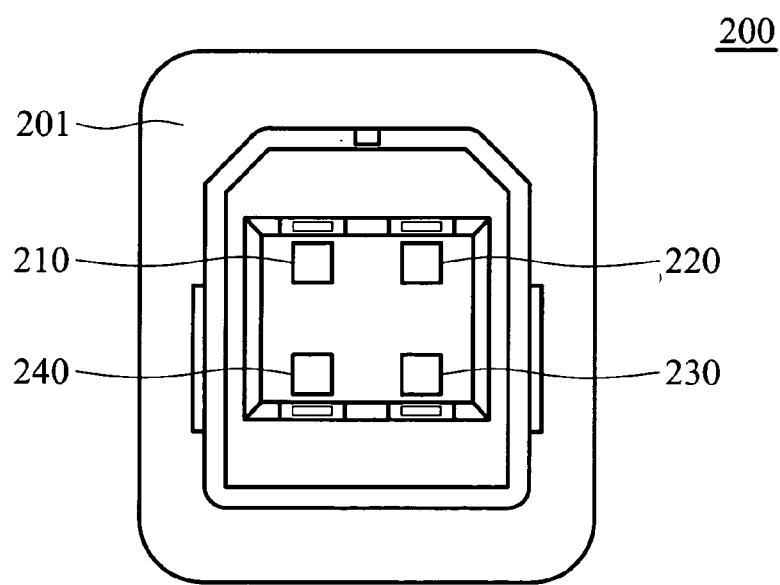
Figure 3D:
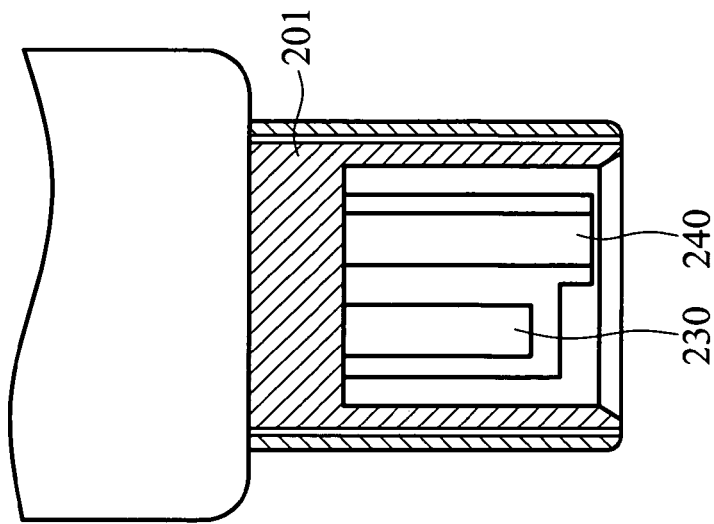
Figure 3C:
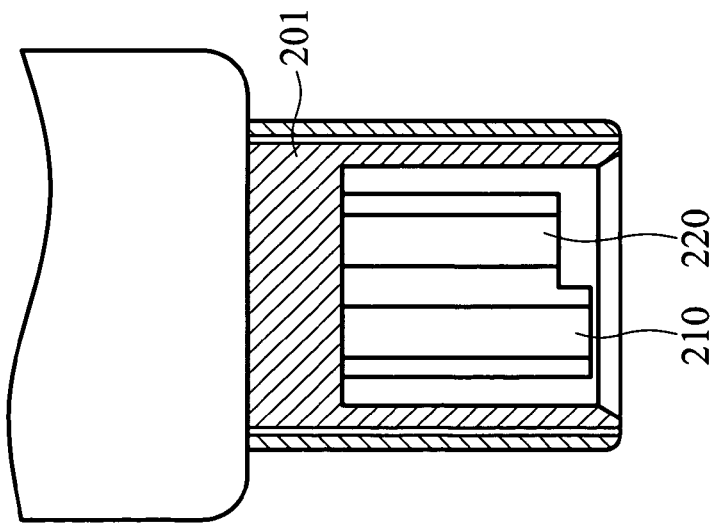

FIGS. 3a, 3b, 3c and 3d depict an embodiment of a USB connector of the invention. The USB connector 200, a male connector of Series B-type, comprises a main body 201, a first pin 210, a second pin 220, a third pin 230 and a fourth pin 240. The first pin 210 transmits signal VBUS, the second pin 220 transmits signal D−, the third pin 230 transmits signal D+, and the fourth pin 240 transmits signal GND. In FIGS. 3c and 3d, the third pin 230 is shorter than the second pin 220 by a predetermined length, 1.00±3.1 mm in this embodiment, ensuring that the second pin 220 connects prior to the third pin 230.

Figure 4A:
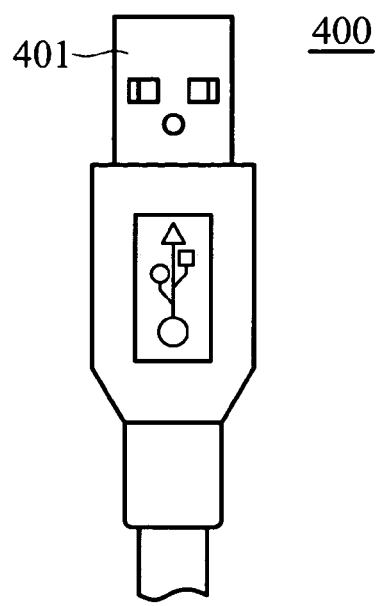
FIGS. 4a, 4b and 4c depict another embodiment of the USB connector of the invention.
Figure 4B:
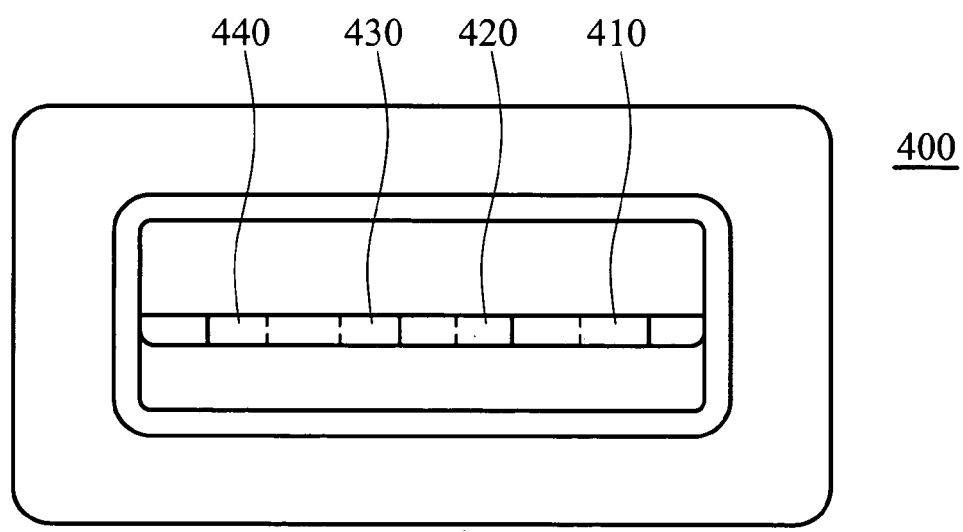
Figure 4C:
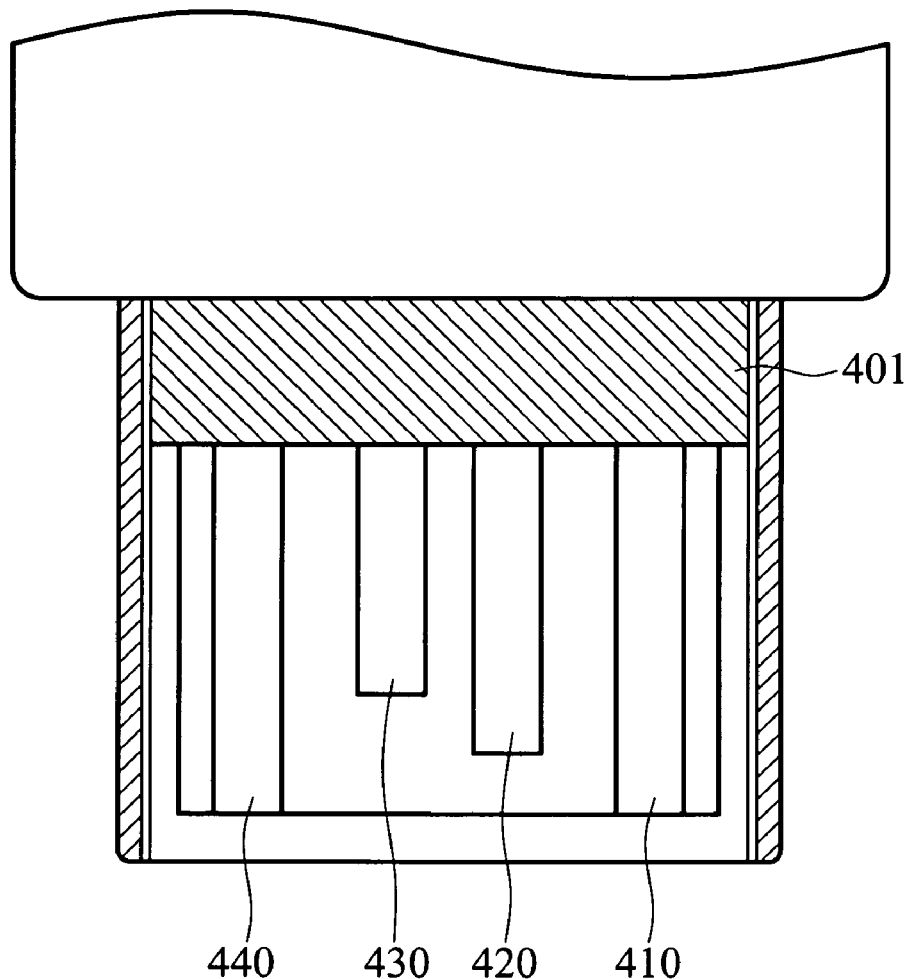

FIGS. 4a, 4b and 4c depict another embodiment of a USB connector of the invention. The USB connector 400, a male connector of Series A-type, comprises a main body 401, a first pin 410, a second pin 420, a third pin 430 and a fourth pin 440. The first pin 410 transmits signal VBUS, the second pin 420 transmits signal D−, the third pin 430 transmits signal D+, and the fourth pin 440 transmits signal GND. In FIG. 4c, the third pin 430 is shorter than the second pin 420 by a predetermined length to ensure that the second pin 420 connects prior to the third pin 430.

Figure 5A:
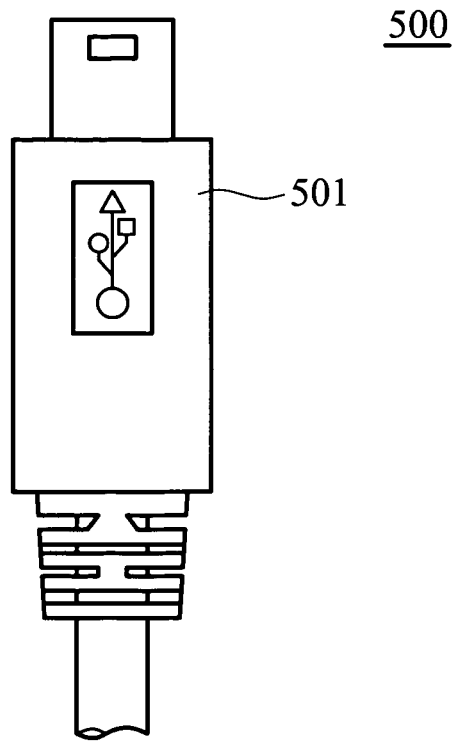
FIGS. 5a, 5b and 5c depict another embodiment of the USB connector of the invention.
Figure 5B:
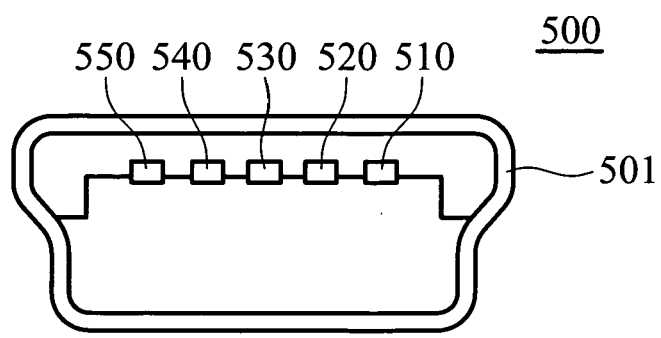
Figure 5C:
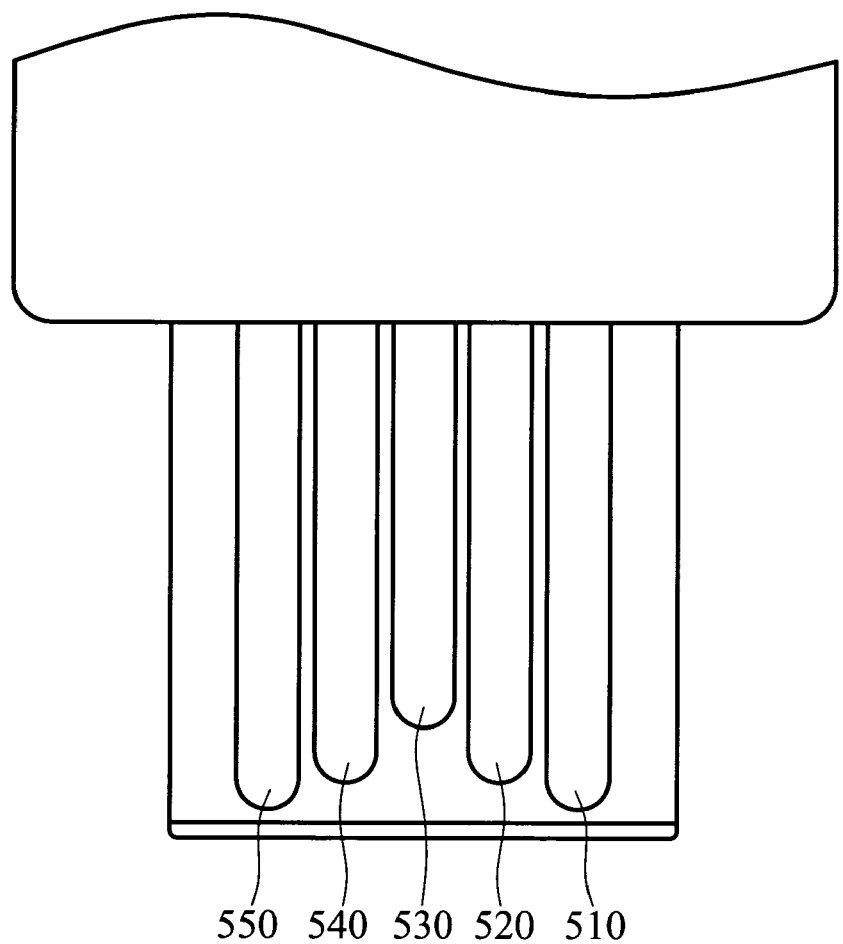

FIGS. 5a, 5b and 5c depict another embodiment of a USB connector of the invention. The USB connector 500, a male connector of Series mini B-type, comprises a main body 501, a first pin 510, a second pin 520, a third pin 530, a fourth pin 540 and a fifth pin 550. The first pin 510 transmits signal VBUS, the second pin 520 transmits signal D−, the third pin 530 transmits signal D+, the fourth pin 540 transmits signal ID and the fifth pin 550 transmits signal GND. In FIG. 54c, the third pin 530 is shorter than the second pin 520 by a predetermined length ensuring that the second pin 520 connects prior to the third pin 530.

Figure 6A:
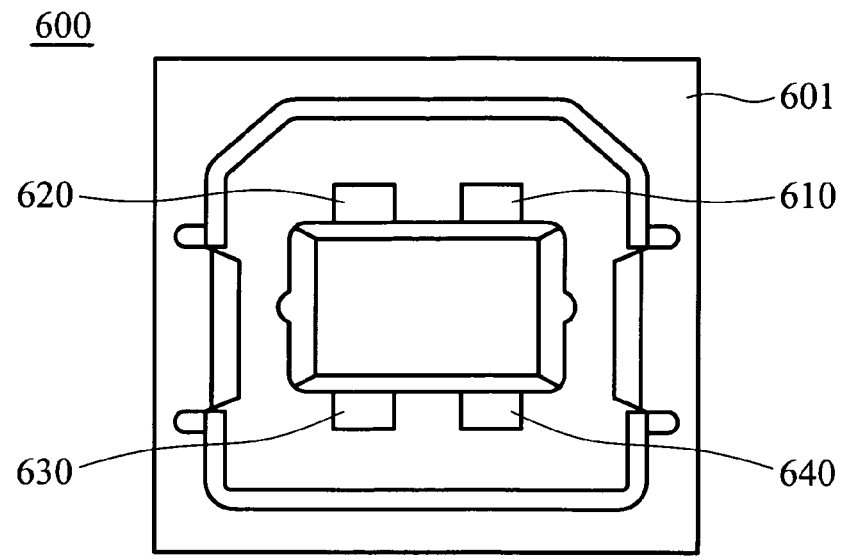
FIGS. 6a and 6b depict another embodiment of the USB connector of the invention.
Figure 6B:
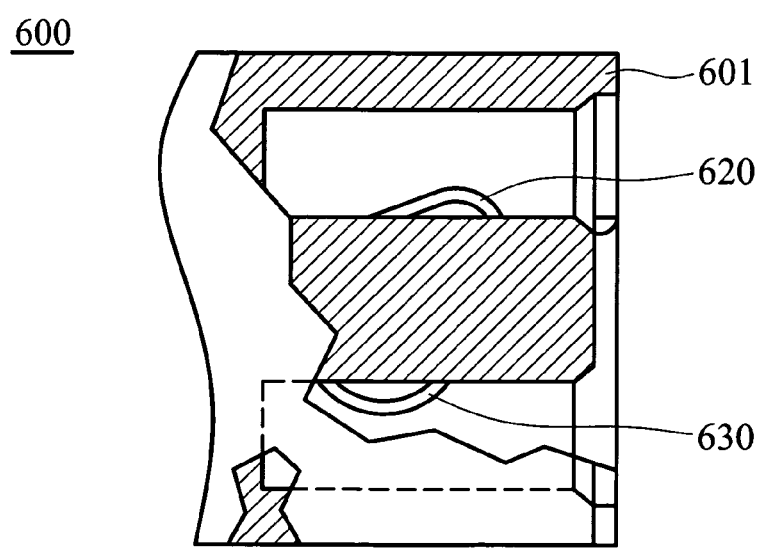

FIGS. 6a and 6b depict another embodiment of a USB connector of the invention. The USB connector 600, a female connector of Series B-type, comprises a main body 601, a first pin 610, a second pin 620, a third pin 630 and a fourth pin 640. The first pin 610 transmits signal VBUS, the second pin 620 transmits signal D−, the third pin 630 transmits signal D+, and the fourth pin 640 transmits signal GND. In FIG. 6b, the third pin 630 is located behind the second pin 620 by a predetermined length ensuring that the second pin 620 connects prior to the third pin 630.

Figure 7A:
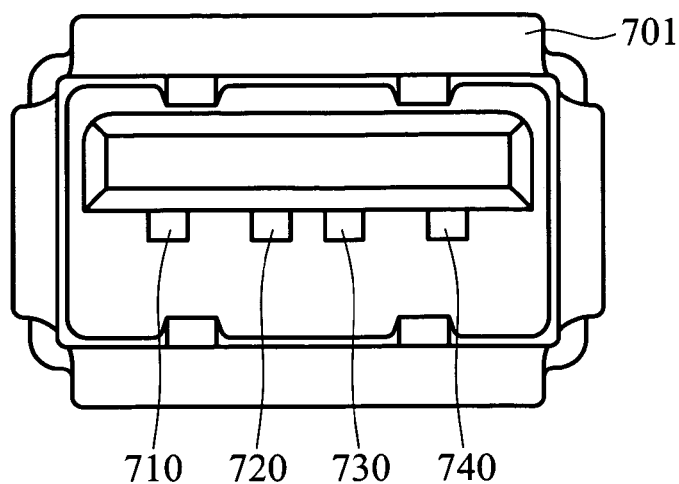
FIGS. 7a and 7b depict another embodiment of the USB connector of the invention.
Figure 7B:
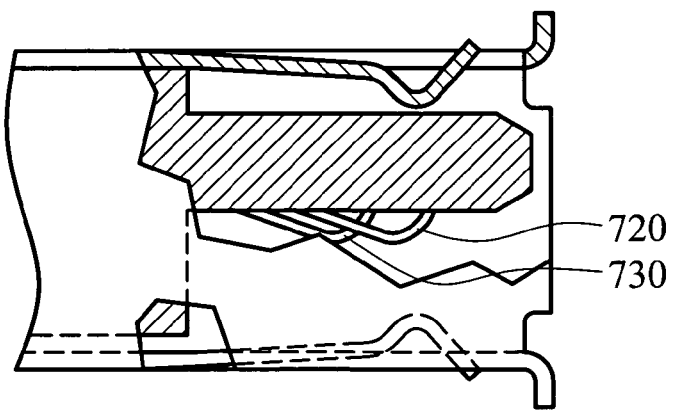

FIGS. 7a and 7b depict another embodiment of a USB connector of the invention. The USB connector 700, a female connector of Series A-type, comprises a main body 701, a first pin 710, a second pin 720, a third pin 730 and a fourth pin 740. The first pin 710 transmits signal VBUS, the second pin 720 transmits signal D−, the third pin 730 transmits signal D+, and the fourth pin 740 transmits signal GND. In FIG. 7b, the third pin 730 is located behind the second pin 720 by a predetermined length ensuring that the second pin 720 connects prior to the third pin 730.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A universal serial bus (USB) connector for connecting a host and a universal serial bus device, comprising:
    a main body;
    a first pin disposed in the main body connecting to a power supply
    a second pin disposed in the main body transmitting signal D−;
    a third pin disposed in the main body transmitting signal D+; and
    a fourth pin disposed in the main body connecting to ground, wherein the third pin is shorter than the second pin by a predetermined length, whereby the host recognizes the universal serial bus device correctly when the universal serial bus device is connected to the host by the universal serial bus connector from the host.

2. The universal serial bus connector as claimed in claim 1, wherein the first, second, third and fourth pins are parallel.

3. The universal serial bus connector as claimed in claim 1, wherein the universal serial bus connector is a male connector of Series A-type.

4. The universal serial bus connector as claimed in claim 1, wherein the universal serial bus connector is a male connector of Series B-type.

5. The universal serial bus connector as claimed in claim 1 further comprising a fifth pin.

6. The universal serial bus connector as claimed in claim 5, wherein the universal serial bus connector is a male connector of Series mini B-type.

7. The universal serial bus connector as claimed in claim 1, wherein the universal serial bus connector is a female connector of Series A-type.

8. The universal serial bus connector as claimed in claim 1, wherein the universal serial bus connector is a female connector of Series B-type.

9. The universal serial bus connector as claimed in claim 1 further comprising a fifth pin.

10. The universal serial bus connector as claimed in claim 9, wherein the universal serial bus connector is a female connector of Series mini B-type.

* * * * *